(12) United States Patent
Carlson et al.

(10) Patent No.: US 11,437,826 B2
(45) Date of Patent: Sep. 6, 2022

(54) BATTERY FAST CHARGING USING MULTIPLE ADAPTOR INPUTS

(71) Applicant: Lenovo (Singapore) Pte. Ltd., Singapore (SG)

(72) Inventors: Jeremy Robert Carlson, Cary, NC (US); Tin-Lup Wong, Chapel Hill, NC (US); Philip John Jakes, Durham, NC (US); Larry Glenn Estes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 293 days.

(21) Appl. No.: 15/347,492

(22) Filed: Nov. 9, 2016

(65) Prior Publication Data
US 2018/0131211 A1 May 10, 2018

(51) Int. Cl.
*H02J 7/00* (2006.01)
(52) U.S. Cl.
CPC ............. *H02J 7/00* (2013.01); *H02J 7/0036* (2013.01); *H02J 7/0045* (2013.01); *H02J 7/00034* (2020.01); *H02J 2207/30* (2020.01)
(58) Field of Classification Search
CPC ............................................. H02J 2007/0062

USPC ........................................................ 320/165
See application file for complete search history.

(56) References Cited

U.S. PATENT DOCUMENTS

| | | | | |
|---|---|---|---|---|
| 5,666,006 A | * | 9/1997 | Townsley ............... | H02J 7/0024 307/43 |
| 2009/0079389 A1 | * | 3/2009 | Ohtomo ................. | B60W 20/13 320/109 |
| 2009/0184687 A1 | * | 7/2009 | Schroeder ............. | H02J 7/0071 320/162 |
| 2013/0165046 A1 | * | 6/2013 | Tang ....................... | H02J 50/10 455/41.2 |

* cited by examiner

*Primary Examiner* — David V Henze-Gongola
(74) *Attorney, Agent, or Firm* — Ference & Associates LLC

(57) ABSTRACT

One embodiment provides an electronic device, including: two or more ports; two or more charging circuits, wherein the two or more ports have an associated charging circuit; a battery; a processor; and a memory device that stores instructions executable by the processor to: detect, at a first port, a physically connected plug; detect, at a second port, a physically connected plug; and provide, via the two or more charging circuits, charging to the battery from both of the detected plugs. Other aspects are described and claimed.

17 Claims, 4 Drawing Sheets

BATTERY FAST CHARGING USING MULTIPLE ADAPTOR INPUTS

BACKGROUND

Mobile electronic devices, e.g., laptop computers, include batteries for powering the device when it is not connected to a commercial power source (e.g., wall power). Batteries are capable of fast charging or quick charging. Fast charging is advantageous in certain circumstances, e.g., when the user of the device wishes to charge the device more quickly than is provided by standard charging.

Fast charging conventionally requires a larger power adapter to provide enough current for fast charging, thus forcing the battery to charge more quickly. Existing solutions for fast charging include a single, large AC adapter that plugs into the power port of the device. Also, a charging circuit for this power port is sized for a maximum charge rate. In situations where fast charging would be most useful, such as when a user is traveling and has a few moments to charge the device up, users typically do not want to be burdened by carrying a large fast charge adapter.

BRIEF SUMMARY

In summary, one aspect provides an electronic device, comprising: two or more ports; two or more charging circuits, wherein said two or more ports have an associated charging circuit; a battery; a processor; and a memory device that stores instructions executable by the processor to: detect, at a first port, a physically connected plug; detect, at a second port, a physically connected plug; and provide, via the two or more charging circuits, charging to the battery from both of the detected plugs.

Another aspect provides a method, comprising: detecting, using a controller, that a plug is physically connected to a first port of an electronic device; detecting, using the controller, that a plug is physically connected to a second port of the electronic device; and providing, via two or more charging circuits associated with the first port and the second port, charging from both of the detected plugs to a battery of the electronic device.

A further aspect provides a system, comprising: a charging unit providing at least two plugs; and an electronic device, comprising: two or more ports that accept the at least two plugs; two or more charging circuits, wherein said two or more ports have an associated charging circuit; a battery; a processor; and a memory device that stores instructions executable by the processor to: detect, at a first port, a physically connected plug; detect, at a second port, a physically connected plug; and provide, via the two or more charging circuits, charging to the battery from both of the detected plugs.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An embodiment provides a fast charging or quick charging system that utilizes two separate charging circuits, and two separate adaptor inputs, that the user connects to ports of an electronic device. In an embodiment, the system will determine a primary or prioritized adapter, e.g., based on power rating and/or likelihood of plug removal. The two adapter inputs provide charging (inflow of current) at a faster rate than possible with a single adaptor input, port and charging circuit.

In an embodiment, the primary or prioritized adapter input provides system power and charge to the battery, i.e., as in a conventional single port system. In an embodiment, the secondary or lower priority adapter input provides charge to supplement the charging of the battery (and does not offer power to the system).

The illustrated example embodiments will be best understood by reference to the figures. The following description is intended only by way of example, and simply illustrates certain example embodiments.

Figure 1:
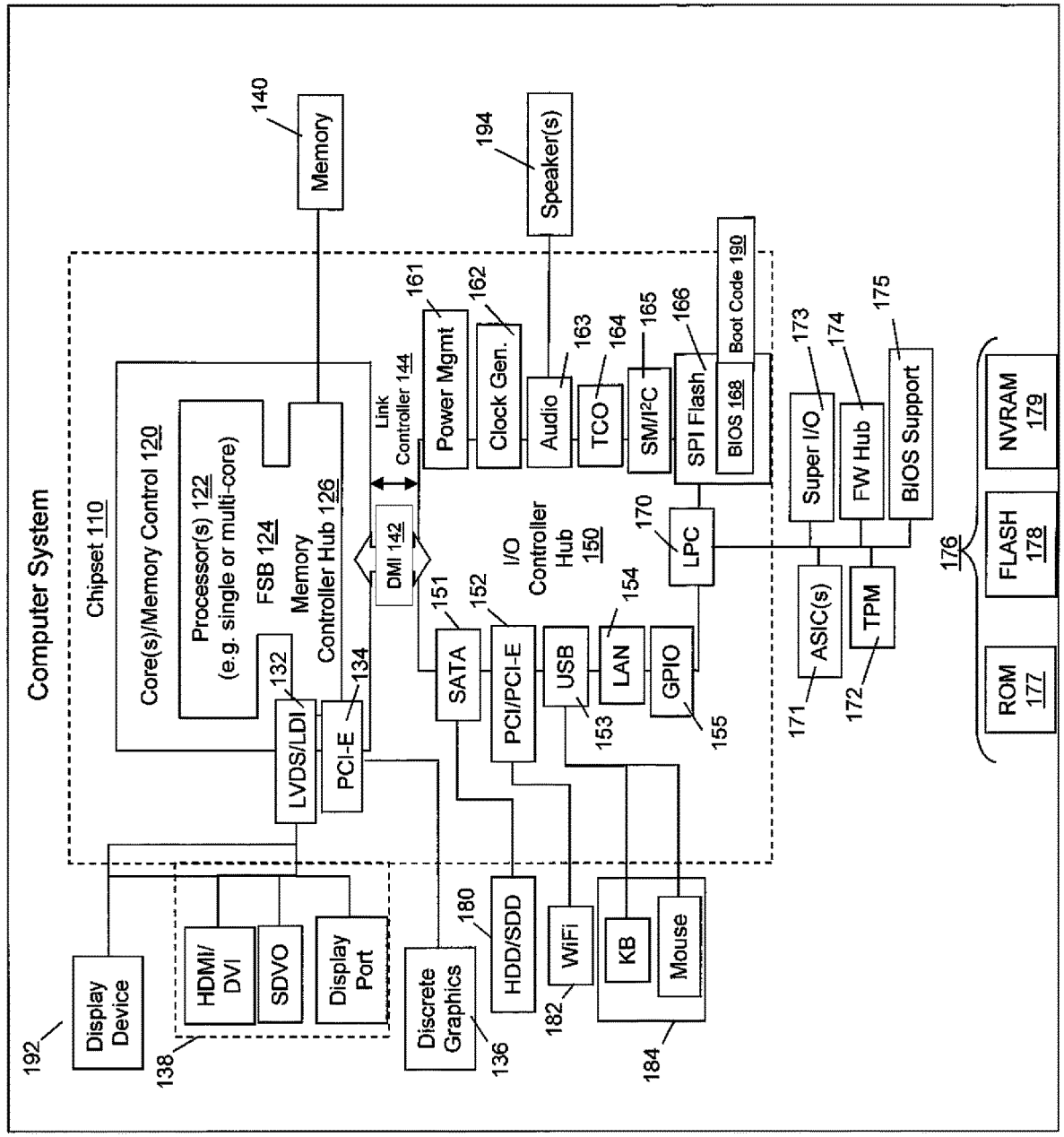
FIG. 1 illustrates an example of electronic device circuitry.

FIG. 1 depicts a block diagram of an example of electronic device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.).

INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 110 includes a core and memory control group 120 and an I/O controller hub 150 that exchanges information (for example, data, signals, commands, etc.) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture. One or more processors 122 comprise internal arithmetic units, registers, cache memory, busses, I/O ports, etc., as is well known in the art.

In FIG. 1, the memory controller hub 126 interfaces with memory 140 (for example, to provide support for a type of RAM that may be referred to as "system memory" or "memory"). The memory controller hub 126 further includes a low voltage differential signaling (LVDS) interface 132 for a display device 192 (for example, a CRT, a flat panel, touch screen, etc.). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, etc., 280), a PCI-E interface 152 (for example, for wireless connections 182), a USB interface 153 (for example, for devices 184 such as a digitizer, keyboard, mice, cameras, phones, microphones, storage, biometric data capture device, other connected devices, etc.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Electronic device circuitry, as for example outlined in FIG. 1, may be used in devices such as laptop computers or other mobile devices having batteries that need to be charged to power the system when it is not plugged into a commercial power source. In certain circumstances, a user may find it necessary or desirable to quickly charge the batteries.

As such, and referring to FIG. 2(A-B), an embodiment provides an electronic device 200A, 200B that includes two ports, and two charging circuits associated therewith, which facilitate fast charging of the batteries of the device.

Figure 2A:
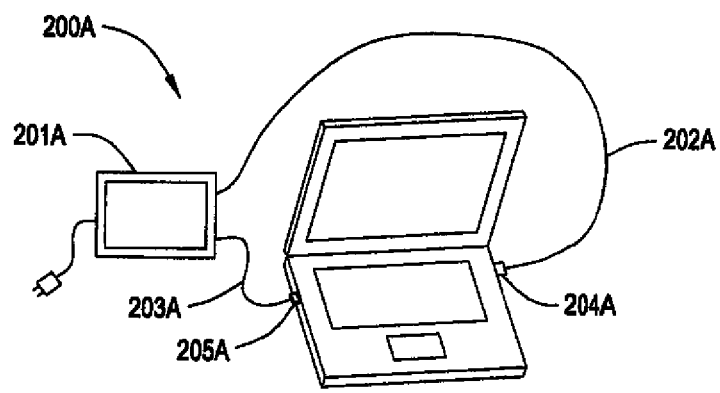
FIG. 2(A-B) illustrates an example of a fast charging system.

Referring to FIG. 2A, an embodiment provides an electronic device 200A that includes two ports 204A, 205A. For example, the two ports 204A, 205A may be different kinds of ports, e.g., a 20V power port 202A and a power and data port 205B, e.g., a USB type C port. The two ports 204A and 205A may be of the same type, e.g., two power and data ports or two 20V power ports. Corresponding plugs 202A, 203A provide power from an adapter 201A, e.g., a single fast charge adapter as illustrated in the non-limiting example of FIG. 2A.

In the example of two power and data ports being utilized at 204A, 205A, in an embodiment, controllers (e.g., USB controllers in the case of USB type C ports being utilized) communicate with the adaptor 201A, e.g., providing battery charging parameters. Both USB ports 204A, 205A are then connected to the battery and the adapter 201A begins charging the battery. The charging comprises parallel charging, i.e., each plug 202A, 203A and each port 202A, 203A, include a charging circuit (in FIG. 3 illustrated as USB controllers 307A, 308A), with the charging circuits being configured to provide parallel charging to the battery (illustrated at 310A). Thus, supplemental power, e.g., two 5 A inputs from two USB Type C plugs, is provided to the battery.

Figure 2B:
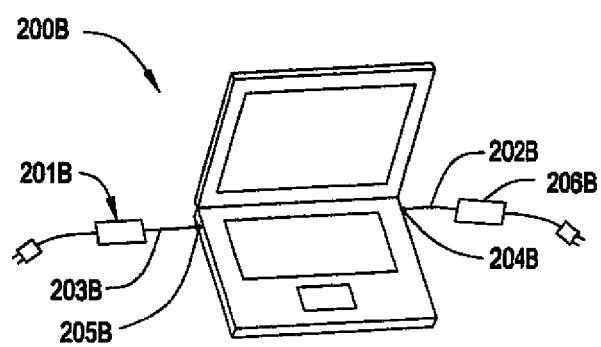

Referring to FIG. 2B, an embodiment provides for plugging two adapters 201B, 206B into the device 200B. For example, two separate USB Type C adapters may be plugged into ports 204B, 205B. As another example, two 20V power adapters may be plugged into ports 204B, 205B, i.e., depending on the port type. As may be appreciated, port types may be mixed, e.g., one power and data port, another being a power port.

The adapters 201B, 206B and corresponding plugs 202B, 203B provide charging current in parallel to the device 200B, e.g., using two charging circuits, i.e., one for each port provided.

Figure 3A:
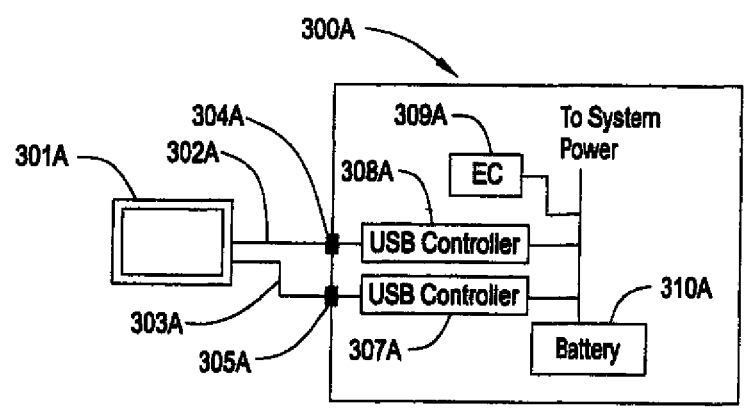
FIG. 3(A-B) illustrates an example of a fast charging system.

Illustrated in FIG. 3(A-B) are examples of system circuitry to accomplish fast charging using a supplemental or additional (e.g., second) power input. In FIG. 3A, an adapter 301A, e.g., a fast charging adapter, provides two plugs 302A, 303A. These plugs 302A, 303A insert into their corresponding ports 304A, 305A. The ports 304A, 305A in turn are operatively coupled to USB controllers (in this non-limiting example) 307A, 308A, which in turn are operatively coupled to a system embedded controller 309A.

In an embodiment, the device 300A, via embedded controller 309A, detects the connection and availability of the plugs 302A, 303A and discovers power availability options available from the adapter 301A. The embedded controller 309A then chooses from among the power options offered by the adapter 301A to initiate charging from both plugs 302A, 303A. The resultant inflow over current from plugs 302A, 303A is routed through ports 304A, 305A, through USB controllers 307A, 308A, and to the battery 310A. Charge control may be managed by the adapter 301A. As illustrated, part of the inflow charge, e.g., from plug 302A, may be routed to run the system (to system power), whereas the other plug 303A may be dedicated as a charging inflow of current.

Figure 3B:
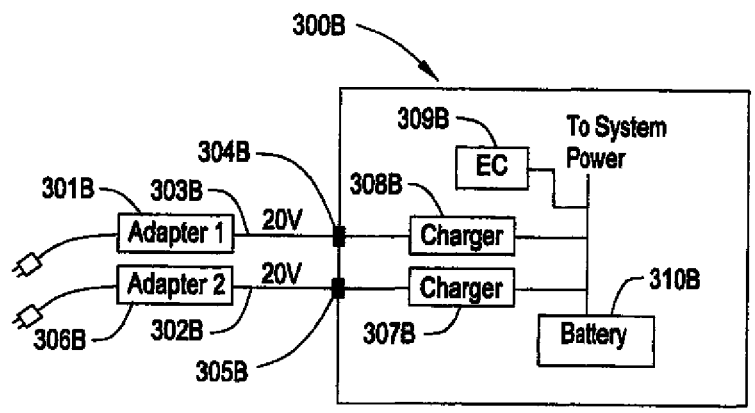

Turning to FIG. 3B, another example embodiment is illustrated. Again, the device 300B may implement supplemental charging input via use of an additional adapter. That is, device 300B includes ports 304B, 305B, which provide inputs for plugs 302B, 303B, each emanating from an adaptor, here 301B, 306B. Again, the adapters may be the same or different, depending on the port types and charging circuits used. In this example, adapter 301B and 306B are 20V power adapters formed in parallel and permitting supplemental charging of the battery 310B. The ports 304B, 305B are supported by dedicated charging circuits (including DC/DC converters) 307B, 308B, which may communicate with an embedded controller 309B of the device to implement direct, parallel charging of the battery 310B. As with FIG. 3A, a plug, e.g., 303B may be used to both charge the battery 310B and power the system, whereas another plug, e.g., 302B, may be used as a dedicated, supplemental charging supply for the battery 310B.

Figure 4:
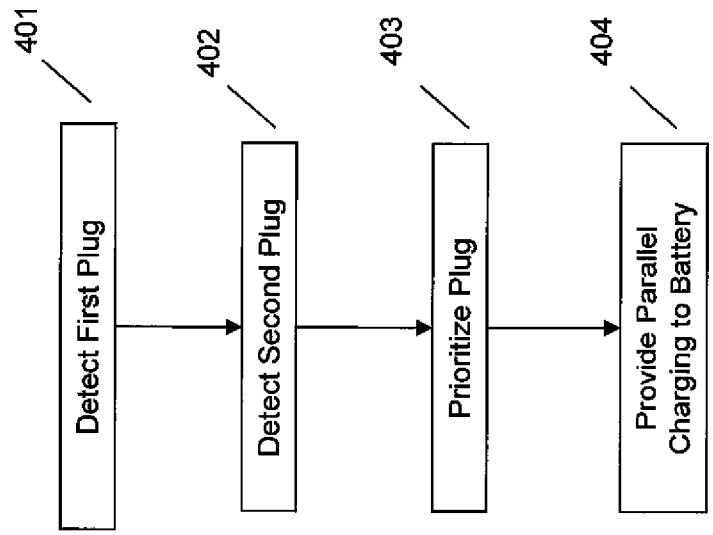
FIG. 4 illustrates an example method of fast charging an electronic device.

As shown in FIG. 4, by way of example, in an embodiment at first plug is detected at 401 and a second plug is detected at 402, i.e., the first and second plugs are detected as being physically inserted into their respective ports and thus connected to the system. As stated herein, an embodiment may prioritize a plug at 403, e.g., select a 20V power plug as a primary charging plug, whereas another plug, e.g., a USB type C plug, may be used as a supplemental current input dedicated to charging the batteries. There may be other reasons to prioritize one port or plug over another, such as an input that is more likely to be removed based on user behavior or configuration (such as a dock).

As such, an embodiment may provide parallel charging to the battery, as illustrated at 404. Thus, part of the current from the first plug is routed to the battery (and another part of the current is routed to a power management system for powering the system, e.g., if the system is running). Another current, i.e., from the second plug, may be input or routed directly to the battery to facilitate fast charging.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium, such as a non-signal storage device, that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An electronic device, comprising:
   two or more ports;
   two or more charging circuits, wherein said two or more ports each correspond to one of the two or more charging circuits, wherein the two or more charging circuits provide parallel current input to the electronic device while an operating system of the electronic device is running;
   a battery;
   a processor; and
   a memory device that stores instructions executable by the processor to:
   detect, at a first port of the two or more ports, a first physically connected plug of an adapter for charging the battery of the electronic device via a first of the two or more charging circuits, wherein current accepted from the first physically connected plug through the first port and the first of the two or more charging circuits is routed to both the battery of the electronic device and a power management system simultaneously, wherein the power management system powers the operating system of the electronic device while the electronic device is running, wherein the processor prioritizes one of the first port and a second port and wherein the prioritized port comprises the first physically connected plug that simultaneously provides power to the electronic device and charges the battery;

detect, at the second port of the two or more ports, a second physically connected plug of an adapter for charging the battery of the electronic device via a second of the two or more charging circuits, wherein current accepted from the second physically connected plug through the second port and the second of the two or more charging circuits is routed to the battery of the electronic device at the same time and in parallel with the current accepted from the first physically connected plug to facilitate fast charging; and provide, via the two or more charging circuits associated with the two or more ports, power to the power management system of the electronic device and charge the battery using the first physically connected plug and additionally charge and supplement the charging of the battery by the first physically connected plug using the second physically connected plug.

2. The electronic device of claim 1, wherein the first port and the second port are different types of ports.

3. The electronic device of claim 2, wherein at least one type of port is a power and data port.

4. The electronic device of claim 3, wherein the processor prioritizes a port that provides a greater amount of charging as compared to another port.

5. The electronic device of claim 1, wherein the first port and the second port are the same type of port.

6. The electronic device of claim 5, wherein of the first port and the second port are power and data ports.

7. The electronic device of claim 5, wherein each of the first port and the second port are power ports.

8. The electronic device of claim 1, further comprising:
a controller associated with at least one of the two or more ports;
wherein the processor is included in a system embedded controller; and
wherein the processor communicates with the controller to select a type of charging from said at least one of the two or more ports.

9. A method, comprising:
detecting, using a controller of an electronic device while an operating system of the electronic device is running, that a first plug of an adapter for charging a battery of the electronic device is physically connected to a first port of the electronic device via a first of two or more charging circuits, wherein the two or more charging circuits provide parallel current input, wherein current accepted from the first plug through the first port and the first of the two or more charging circuits is routed to both the battery of the electronic device and a power management system simultaneously, wherein the power management system powers the operating system of the electronic device while the electronic device is running, wherein the processor prioritizes one of the first port and a second port and wherein the prioritized port comprises the first physically connected plug that simultaneously provides power to the electronic device and charges the battery;

detecting, using the controller, that a second plug of an adapter for charging the battery of the electronic device is physically connected to the second port of the electronic device via a second of the two or more charging circuits, wherein current accepted from the second plug through the second port and the second of the two or more charging circuits is routed to the battery of the electronic device at the same time and in parallel with the current accepted from the first physically connected plug to facilitate fast charging; and providing, via the first of the two or more charging circuits associated with the first port and he second of the two or more charging circuits associated with the second port, power to the power management system of the electronic device and charge the battery using the first physically connected plug and additionally charge and supplement the charging of the battery by the first physically connected plug using the second physically connected plug.

10. The method of claim 9, wherein the first port and the second port are different types of ports.

11. The method of claim 10, wherein at least one type of port is a power and data port.

12. The method of claim 10, further comprising prioritizing one of the first port and the second port, wherein the prioritized port comprises the first physically connected plug that simultaneously provides power to the electronic device and charges the battery.

13. The method of claim 11, wherein the prioritizing a port that provides a greater amount of charging as compared to another port.

14. The method of claim 9, wherein the first port and the second port are the same type of port.

15. The method of claim 14, wherein each of the first port and the second port are power and data ports.

16. The method of claim 14, wherein each of the first port and the second port are power ports.

17. A system, comprising:
a charging unit providing at least two plugs; and
an electronic device having an operating system that is running, comprising:
two or more ports that accept each of the at least two plugs;
two or more charging circuits, wherein said two or more ports each have an associated charging circuit, wherein the two or more charging circuits provide parallel current input;
a battery;
a processor; and
a memory device that stores instructions executable by the processor to:
detect, at a first port of the two or more ports, a first physically connected plug of an adapter for charging the battery of the electronic device via a first of the two or more charging circuits, wherein current accepted from the first physically connected plug through the first port and the first of the two or more charging circuits is routed to both the battery of the electronic device and a power management system simultaneously, wherein the power management system powers the operating system of the electronic device while the electronic device is running, wherein the processor prioritizes one of the first port and a second port and wherein the prioritized port comprises the first physically connected plug that simultaneously provides power to the electronic device and charges the battery;
detect, at the second port of the two or more ports of the electronic device, a second physically connected plug of an adapter for charging the battery of the electronic device via the second of the two or more charging circuits, wherein current accepted from the second physically connected plug through the second port and the second of the tow or more charging circuits is routed to the battery of the electronic device at the same time and in parallel with the current accepted from the first physically connected plug to facilitate fast charging; and provide, via the two or more charging circuits associated with the two or more ports, power to the power management system of the electronic device and charge the battery using the first physically connected plug and additionally charge and supplement the charging of the battery by the first physically connected plug using the second physically connected plug.

\* \* \* \* \*